H. Wells,
Fastening Engravers' Blocks.
No. 43,057. Patented June 7, 1864.
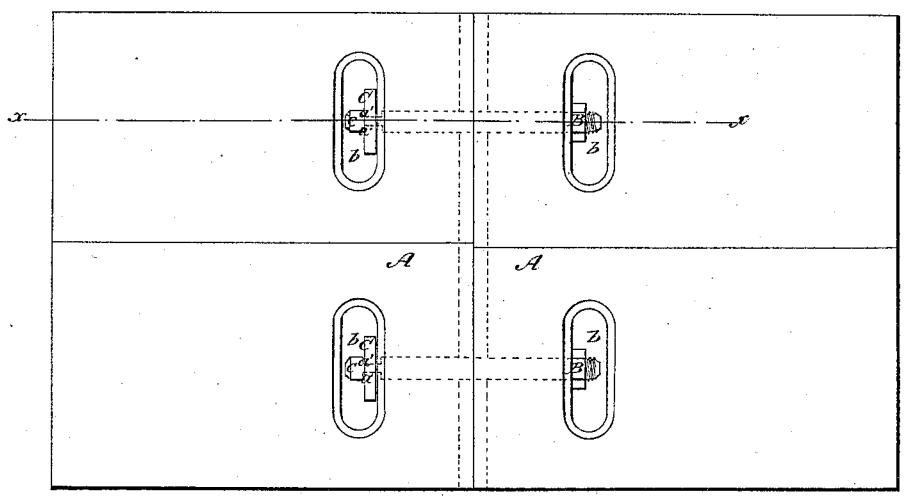
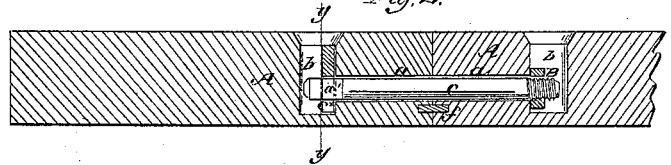
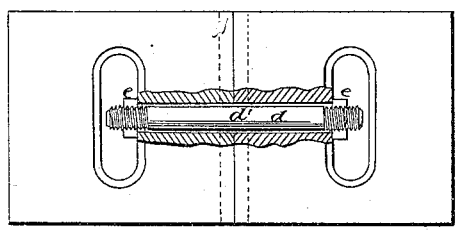
Witnesses.
Jas. P. Hall.
Geo. W. Reed.
Inventor.
Heber Wells

UNITED STATES PATENT OFFICE.

HEBER WELLS, OF NEW YORK, N. Y.

FASTENING FOR WOODEN BLOCKS.

Specification forming part of Letters Patent No. 43,057, dated June 7, 1864.

*To all whom it may concern:*

Be it known that I, HEBER WELLS, of the city, county, and State of New York, have invented a new and useful Improvement in Securing Together Wooden Blocks for Engravers' Use; and I do hereby declare that the following is a full, clear, and exact description of the same, reference being had to the accompanying drawings, making a part of this specification, in which—

Figure 1 is a back view of an engraver's block, the parts of which are secured together according to my invention; Fig. 2, a section of the same, taken in the line *x x*, Fig. 1; Fig. 3, a section of Fig. 2, taken in the line *y y*; Fig. 4, a view of a block with its parts secured together in the ordinary way.

Similar letters of reference indicate corresponding parts in the several figures.

The wooden blocks used by engravers are, when of any material size, composed of several pieces, some of which are secured together by bolts so arranged and applied that the parts thus connected may be disconnected and put together again when required. The object of this is to admit of several engravers working simultaneously on the same design, and thereby expedite the engraving of large blocks. The design is drawn upon the block by the artist when the several parts of the former are all connected together, and after the design is drawn the parts of the block are disconnected and each part given to an engraver, and when the engraving of each part is finished they are again secured together. These blocks are at present secured together by metal rods or bolts turned in biconical form, a screw being cut on each end of the rod and a nut fitted on it, the rod passing through a hole in the blocks and the nuts fitted in recesses made in the blocks. This arrangement is attended with considerable trouble and inconvenience in connecting and disconnecting the parts of the blocks, and the bolts are expensive to manufacture—objections which are fully obviated by my invention.

To enable those skilled in the art to fully understand and construct my invention, I will proceed to describe it.

A A, Figs. 1 and 2, represent the two parts of an engraver's block secured together according to my invention. These parts have have each two holes, *a*, bored into their adjoining or abutting ends, and at such points that they will register or be in line with each other when the parts are placed together in contact, as will be understood by referring to Fig. 2.

In the back surfaces of the two parts A A there are made recesses *b*, with which the ends of the holes *a* communicate, and in the holes *a* there are inserted bolts, one in each, formed of a rod, *c*, having a screw cut on one end to receive a nut, B, which is in one of the recesses *b*, and a square or two grooves, *a' a'*, made transversely in the rod, near its opposite end, to receive a key or check, C, which is in the opposite recess, *b*. The keys or checks C are flat metal plates having a slot, $c^\times$, made in them, so that they may be fitted over the recessed ends of the rods *c*, as shown in Fig. 3. The lower ends of the keys or checks rest or bear against the bottoms of the recesses *b*, and effectually prevent the rods *c* from turning when the nuts B are being screwed up. The rods *c* are fitted in the holes *a* of one of the parts A, and the nuts B fitted on the ends of the rods *c*. The other parts of the rods *c* are then passed into the holes of the other part, A, and the keys or checks C fitted on the rods within the grooves *a'*. The nuts B are then screwed up and the two parts firmly secured together.

In order to detach the two parts A A, all that is required is simply to loosen the nuts B a trifle and the keys or checks may be withdrawn and the two parts separated. The plan now practised is shown in Fig. 4. The rod *d* is turned in biconical form, or, technically speaking, "coned off" from its center, *d'*, outward toward each end, and a screw is cut on each end of the rod *d* to secure nuts *e*. This plan is attended with the following disadvantages: In the first place, the coning off of the rod *d*, which is done in a lathe, is expensive, augmenting to a considerable degree the cost of the bolts, and in the second place the nut *e* at one end of the rod requires to be entirely removed in order to detach the parts, and the detached nuts are liable to be lost or mislaid, and some trouble is experienced in adjusting the nut on the rod and starting it properly when the parts are to be secured together. The rod *d* is coned off, in order that it may bind tightly in the holes in which it is fitted or driven and be prevented from turning when the nuts *e* are screwed on and off. By my improvement the nut B on the rod $c$ requires to be unscrewed but a trifle, just enough to admit of the keys or checks being withdrawn from the rod; consequently, the parts A A may be taken apart and screwed together with the greatest facility. The rods $c$ also may be perfectly cylindrical, as the keys or checks effectually prevent them from turning when the nuts B are turned, and the expense of coning off is therefore avoided.

I would remark that one recess, $b$, instead of two, may be made in each rod for the keys or checks to fit over, but two would probable be preferable. I would further remark that a cleat, $f$, is fitted in the adjoining edges of the parts A A to insure the faces of the parts being brought flush with each other. This cleat, however, is used with the old plan shown in Fig. 4.

Having thus described my invention, what I claim as new, and desire to secure by Letters Patent, is—

The rod $c$, provided with the screw-nuts B, in combination with the keys or checks C, all arranged and applied substantially as and for the purpose herein set forth.

HEBER WELLS.

Witnesses:
J. W. COOMBS,
GEO. W. REED.